United States Patent
Iwatsu

(10) Patent No.: US 7,627,702 B2
(45) Date of Patent: Dec. 1, 2009

(54) DATA REPRODUCTION DEVICE AND METHOD, AND PROGRAM

(75) Inventor: Takeshi Iwatsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 302 days.

(21) Appl. No.: 10/565,965

(22) PCT Filed: Aug. 6, 2004

(86) PCT No.: PCT/JP2004/011643

§ 371 (c)(1),
(2), (4) Date: Jan. 26, 2006

(87) PCT Pub. No.: WO2005/034089

PCT Pub. Date: Apr. 14, 2005

(65) Prior Publication Data

US 2006/0209615 A1    Sep. 21, 2006

(30) Foreign Application Priority Data

Sep. 30, 2003    (JP) ............................. 2003-341663

(51) Int. Cl.
G06F 13/12    (2006.01)
G06F 13/38    (2006.01)

(52) U.S. Cl. .............................. 710/68; 710/5; 710/52; 704/500; 704/501; 709/233; 365/230.05

(58) Field of Classification Search ................ 704/500, 704/501, E19.048; 365/230.05; 709/233; 710/68, 52

See application file for complete search history.

(56) References Cited

U.S. PATENT DOCUMENTS 6,292,834 B1 *   9/2001   Ravi et al. ................. 709/233
6,993,283 B1 *   1/2006   Ka Ming et al. ............ 455/3.01
7,009,533 B1 *   3/2006   Wegener ...................... 341/76
2002/0120747 A1 * 8/2002   Frerichs et al. ............. 709/227
2002/0120752 A1 * 8/2002   Logan et al. ................ 709/228
2003/0216925 A1 * 11/2003  Koyanagi .................... 704/500
2004/0008615 A1 * 1/2004   Oh ............................. 370/203
2005/0053354 A1 * 3/2005   Takahashi et al. ............. 386/46

(Continued)

FOREIGN PATENT DOCUMENTS

JP        8-237133        9/1996

(Continued)

OTHER PUBLICATIONS

"Karbos Guide.com Module 7d4" Aug. 8, 2003, p. 2 http://www.karbosguide.com/hardware/module7d4.htm.*

(Continued)

Primary Examiner—Henry W. H. Tsai
Assistant Examiner—Tushar S Shah
(74) Attorney, Agent, or Firm—Oblon, Spivak, McClelland, Maier & Neustadt, L.L.P.

(57) ABSTRACT

Memory resources can be optimized by dynamically determining a threshold value of a storage device used for buffering in accordance with a compression rate of data for streaming reproduction. A data reproduction device for temporarily storing compressed data that is downloaded from a server and sequentially performing the streaming reproduction, wherein the amount of data stored in a HDD is optimized by changing and setting the threshold value in accordance with the compression rate of the compressed data.

19 Claims, 9 Drawing Sheets

U.S. PATENT DOCUMENTS

2005/0060701 A1  3/2005  Murase ....................... 717/178
2005/0091679 A1  4/2005  Tanaka et al. .................. 725/8

FOREIGN PATENT DOCUMENTS

| | | |
|---|---|---|
| JP | 10-11092 | 1/1998 |
| JP | 10-56385 | 2/1998 |
| JP | 2000-138591 | 5/2000 |
| JP | 2001-282297 | 10/2001 |
| JP | 2001-291379 | 10/2001 |
| JP | 2002-268691 | 9/2002 |

OTHER PUBLICATIONS

U.S. Appl. No. 10/526,902, filed Aug. 16, 2005, Yamashita et al.
U.S. Appl. No. 10/554,542, filed Oct. 25, 2005, Iwatsu et al.
U.S. Appl. No. 10/564,317, filed Jan. 12, 2006, Kikkoji et al.
U.S. Appl. No. 10/557,207, filed Nov. 17, 2005, Kikkoji et al.
U.S. Appl. No. 10/555,654, filed Nov. 4, 2005, Kikkoji et al.
U.S. Appl. No. 10/556,944, filed Nov. 16, 2005, Kikkoji et al.
U.S. Appl. No. 10/563,258, filed Jan. 4, 2006, Iwatsu et al.
U.S. Appl. No. 10/557,141, filed Nov. 17, 2005, Murase et al.
U.S. Appl. No. 10/556,728, filed Nov. 14, 2005, Iwatsu et al.
U.S. Appl. No. 10/563,315, filed Jan. 4, 2006, Iwatsu et al.
U.S. Appl. No. 10/557,193, filed Nov. 17, 2005, Kikkoji et al.
U.S. Appl. No. 10/566,630, filed Jan. 31, 2006, Sakoh et al.
U.S. Appl. No. 10/561,187, filed Dec. 16, 2005, Araki et al.
U.S. Appl. No. 10/565,965, filed Jan. 26, 2006, Iwatsu.
U.S. Appl. No. 10/564,058, filed Jan. 10, 2006, Kikkoji et al.
U.S. Appl. No. 10/556,893, filed Nov. 15, 2005, Sakoh et al.
U.S. Appl. No. 10/557,040, filed Nov. 16, 2005, Kikkoji et al.
U.S. Appl. No. 10/556,729, filed Nov. 14, 2005, Kikkoji et al.
U.S. Appl. No. 10/555,990, filed Nov. 8, 2005, Murase et al.
U.S. Appl. No. 10/560,229, filed Dec. 12, 2005, Kikkoji et al.
U.S. Appl. No. 10/564,062, filed Jan. 10, 2006, Kikkoji et al.
U.S. Appl. No. 10/567,689, filed Feb. 9, 2006, Kikkoji et al.
U.S. Appl. No. 10/567,033, filed Feb. 3, 2006, Sakoh et al.
U.S. Appl. No. 10/572,743, filed Mar. 21, 2006, Kikkoji et al.
U.S. Appl. No. 10/564,414, filed Jan. 12, 2006, Sakoh et al.
U.S. Appl. No. 10/571,540, filed Mar. 10, 2006, Sakoh et al.
U.S. Appl. No. 10/567,776, filed Feb. 9, 2006, Iwatsu et al.
U.S. Appl. No. 10/568,968, filed Feb. 22, 2006, Okuzawa.
U.S. Appl. No. 10/569,227, filed Feb. 23, 2006, Yasuda.
U.S. Appl. No. 10/573,580, filed Mar. 24, 2006, Sakoh et al.
U.S. Appl. No. 10/573,418, filed Mar. 27, 2006, Iwatsu et al.
U.S. Appl. No. 10/571,458, filed Mar. 13, 2006, Iwatsu et al.
U.S. Appl. No. 10/571,774, filed Mar. 15, 2006, Sakoh et al.
U.S. Appl. No. 10/573,647, filed Mar. 28, 2006, Kikkoji et al.

\* cited by examiner

DATA REPRODUCTION DEVICE AND METHOD, AND PROGRAM

TECHNICAL FIELD

The present invention relates to a data reproduction device, method and program, particularly to a data reproduction device, method and program for changing a buffering threshold value of content data according to a bit rate, for streaming reproduction.

BACKGROUND OF THE INVENTION

Streaming reproduction is a technology for starting reproduction of data before completion of reception of the whole data from a server and continuing it in parallel with the reception of the data, when a client requests data transfer to the server.

Some examples of the data streaming technology currently in use are RealAudio(Trademark), RealVideo(Trademark) and RealPlayer(Trademark) of the Progressive Networks (Seattle, Wash.).

As a means to highly compressing data today, there are ATRAC3 (Adaptive Transform Acoustic Coding 3) (Trademark), MP3 (MPEG Audio Layer 3), etc., capable of realizing much higher compression rate compared to conventional data compression formats.

The streaming reproduction process may be regarded as consisted of a download process from a network, a buffering process of the download data in a terminal and a reproduction process of the buffered data.

Regarding the download process, there are some problems such that buffering time varies depending on the network instability, etc., however, some means to avoid quality loss in the reproduced data has been devised for buffering for mobile information devices.

That is, it is possible to assure stable reproduction quality and to optimize the time to start the reproduction of the music by parameterizing a degree of download instability and the transmission capacity of the network indicating the required time for buffering, and setting an optimum threshold value for the parameters.

The following patent document 1 has a description of the invention related to data download from a server and streaming reproduction by an information-terminal device.

In streaming reproduction, reproduction will stop unless a data transfer rate is larger than a data consumption rate by the reproduction, because the reproduction will outpace the transfer of the data. Accordingly, it is required to take a large data transfer rate for streaming reproduction. In the streaming reproduction, however, if the transfer rate is too large by contraries, buffer overflow may occur when large data in excess of internal buffer size implemented by the client side is requested and transferred at one time, the data overflows in the buffer, causing data loss of the overflow data. To avoid this situation, it is necessary to request the server to send a part of data at a time and repeat the request many times. In the streaming reproduction, however, such a highly frequent request may result in the increased ratio of redundant data such as header information, etc., causing degraded data transfer efficiency or delay in the response time after request. And consequently, in the streaming reproduction, reproduction may also catch up with the data transmission, causing the reproduction to halt, etc.

Such problems are especially apparent for the mobile information devices often with limited memory size to use for an internal buffer, and for data download under such transmission conditions as the Internet with unstable transmission rate.

FIG. 9 shows an example of the streaming reproduction procedure in the patent document 1.

First, the information terminal device calculates the first request size (S11). Next, the information terminal device requests the server to transfer partial data of this calculated request size (S12). After that, the information terminal device starts receiving the data (S13), waits for buffering of a prescribed amount of data (d0) (S14) before starting reproduction (S15). Then, the information terminal device continues the following processing until all downloaded data are reproduced (S16). The amount of the entire data can be recognized by the information terminal device beforehand by the information from the server prior to starting download.

The information terminal device determines whether all the partial data requested this time was acquired on not in the following step S17. The information terminal device returns to the previous step S15 until all of the partial data is acquired. After all the partial data requested at the time is acquired, the information terminal device calculates the request size at the time (S18). If the request size of the remaining data to be transferred from the server is less than the request size (Yes in S19), the information terminal device requests to transfer the remaining data (S21). Otherwise (No in S19), the information terminal device checks the size of the data remaining in the buffer (br) (S20). The information terminal device goes back to the step S15 and continues the reproduction until the remaining amount becomes less than the threshold value. When the remaining data in the buffer (br), which is not reproduced yet, becomes smaller than the threshold value, it is indicated that the request size R1 becomes larger than the predefined size. In the step S15 processing, coming back from the step S20, the information terminal device does not perform the reception processing, since it has finished the reception of the partial data of the previous request.

When the size of the remaining data in the buffer becomes less than the threshold value in the step S20, the information terminal device requests the server to transfer the subsequent partial data of the request size (S21). Then, the information terminal device goes back to the step S15 and performs the reception and reproduction in parallel.

It is described that with this streaming reproduction method, reproduction can be started immediately in response to user's request, and efficient data transfer can be realized by effectively using the limited buffer capacity to request the server to send a part of the data sequentially for one download for streaming reproduction of the downloaded data.

Patent document 1: Japanese Patent Application Laid-open No. 2002-215516 (Paragraph No. [0036] to [0039], FIG. 6)

However, when expanding the compressed data in the buffer at the information terminal device, it is not possible to assure reproduction quality or proper time to start reproduction if the threshold value is decided without taking account of the compression rate of the data to be reproduced, since the expanded data size will be different case by case, depending on the compression rate.

Besides, if the threshold value for starting reproduction is fixed only for a particular compression rate, the reproduction quality and the time to start reproduction will be varied depending on each music, for the data to be reproduced from the compressed data that is transmitted in varied compression rate, for the information terminal device that reproduces music with variable compression rate.

Moreover, since the application software for reproducing the compressed data generally has different requirements for the reproduction start time depending on each application, it was difficult to assure reproduction quality and to optimize the memory resource without taking account of the compression rate of the reproduction data.

Disclosure of the Invention

The present invention was made with consideration of such status, and the objective of the present invention is to provide a data reproduction device, method and program intended for the optimization of a memory resource by dynamically deciding a threshold value of a memory device for buffering, according to a compression rate of data for streaming reproduction.

To solve the problem, a data reproduction device according to the present invention for expanding and reproducing compressed data downloaded through a communication network comprises: a memory means for temporarily storing the compressed data downloaded; a data expanding means for expanding the compressed data stored in the memory means; a reproducing means for performing streaming reproduction on data expanded by the data expanding means; a detecting means for detecting a data size of the compressed data temporarily stored in the memory means and a compression rate of the compressed data downloaded; and a control means for controlling to change a threshold value for the data size of the compressed data in accordance with the compression rate detected by the detecting means, and reading the compressed data from the memory means when the data size of the compressed data temporarily stored in the memory means reaches a prescribed threshold or more and transferring the compressed data to the data expanding means.

In addition, a data reproduction method according to the present invention for expanding and reproducing compressed data downloaded through a communication network comprises:

(a) a step of making a connection to a server delivering the compressed data;

(b) a step of requesting the server to transfer partial data of a maximum size within such a range that the compressed data does not overflow into a memory means at a time of downloading the compressed data;

(c) a step of starting reproduction compressed data of a prescribed amount is stored;

(d) a step of detecting a data size of compressed data temporarily stored in the memory means, and a compression rate of the compressed data downloaded;

(e) a step of controlling to change a threshold value for the data size of the compressed data in accordance with the compression rate detected in the step (d);

(f) a step of checking whether or not unreproduced compressed data in the memory means becomes less or equal to the threshold value; and (g) a step of stopping reproduction when the compressed data is determined as being less or equal to the threshold value in the step (f), wherein the steps (c), (d), (e), (f), (g) are repeated until a transfer request of all data is completed.

The data reproduction device, method and program of the present invention changes and sets the threshold value for the data size to be temporarily stored in the memory means, corresponding to the bit rate of the contents transferred as compressed data for the streaming reproduction of the contents provided from the server, whereby it is ensured that the discontinuity and the like of the reproduced music can be definitely prevented.

Besides, the data reproduction device, method and program can assure the quality of reproduction and make adjustments of the quality by selecting the threshold value of buffering corresponding to the bit rate.

BEST MODE FOR CARRYING OUT THE INVENTION

A preferred embodiment of the data reproduction device for the optimization of the memory resource by dynamically adjusting the threshold value of the memory device for the buffer, corresponding to the compression rate of the data for the streaming reproduction is described in the followings.

Figure 1:
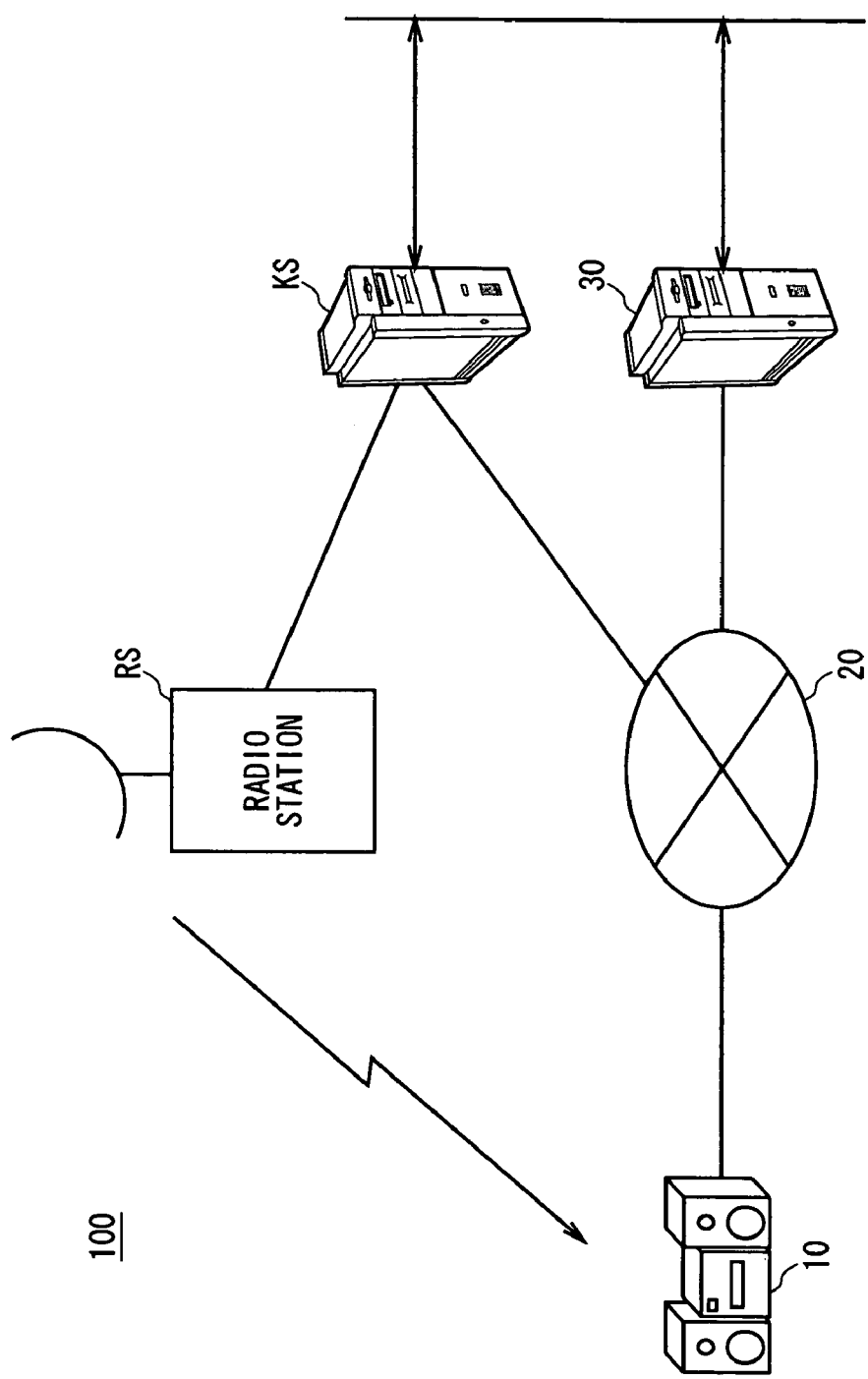
FIG. 1 shows an overall configuration of an information service system in which a data reproduction device of one embodiment of the present invention is applicable as a client terminal.

FIG. 1 shows the overall configuration of an information service system in which the data reproduction device of one embodiment of the present invention is applicable as a client terminal.

As shown in FIG. 1, '100' denotes the information service system as a whole, and the client terminal '10' receives the broadcasting from the radio station RS.

In this information service system 100, the relevant information server KS configured with computers connected to the radio station RS through an exclusive line, provides the homepage of the radio station RS for the radio station RS. This relevant information server KS is configured to be capable of providing the music information related to the music broadcast from the radio station RS when requested from the client terminal 10, as relevant information through a network such as Internet 20.

The relevant information server KS of the information service system 100 notifies the URL (Uniform Resource Locator) information indicating the access point of the information providing service on the Internet 20 through the homepage, etc., to the URL server 30. This information service includes the service for providing music data described later in a compressed form on demand from the users.

If ever the URL indicating the accessing address of the information providing service is changed, the URL providing server 30 keeps track of the URL changes with notification from the relevant information providing server KS. Therefore, the URL providing server 30 can always provide the latest URL to the inquiries from the client terminal 10 about the accessing address for the information providing service of the radio station RS.

Now, in some cases, the same frequency is shared by a number of areas, since the receivable area of the radio broadcasting is limited. For example, the frequency of 80.0 MHz is used by the FM Tokyo in the Tokyo metropolitan area and by the FM Aomori in the Tohoku district.

That is, the client terminal 10 can not identify the radio station RS for the URL providing server 30 only from the frequency, so it notifies an unique information called "call sign" for identifying the radio station RS to the URL providing server 30. Thereby, the client terminal 10 can receive the correct URL of the access point for the information providing service of the radio station RS, from the URL providing server 30.

Figure 2:
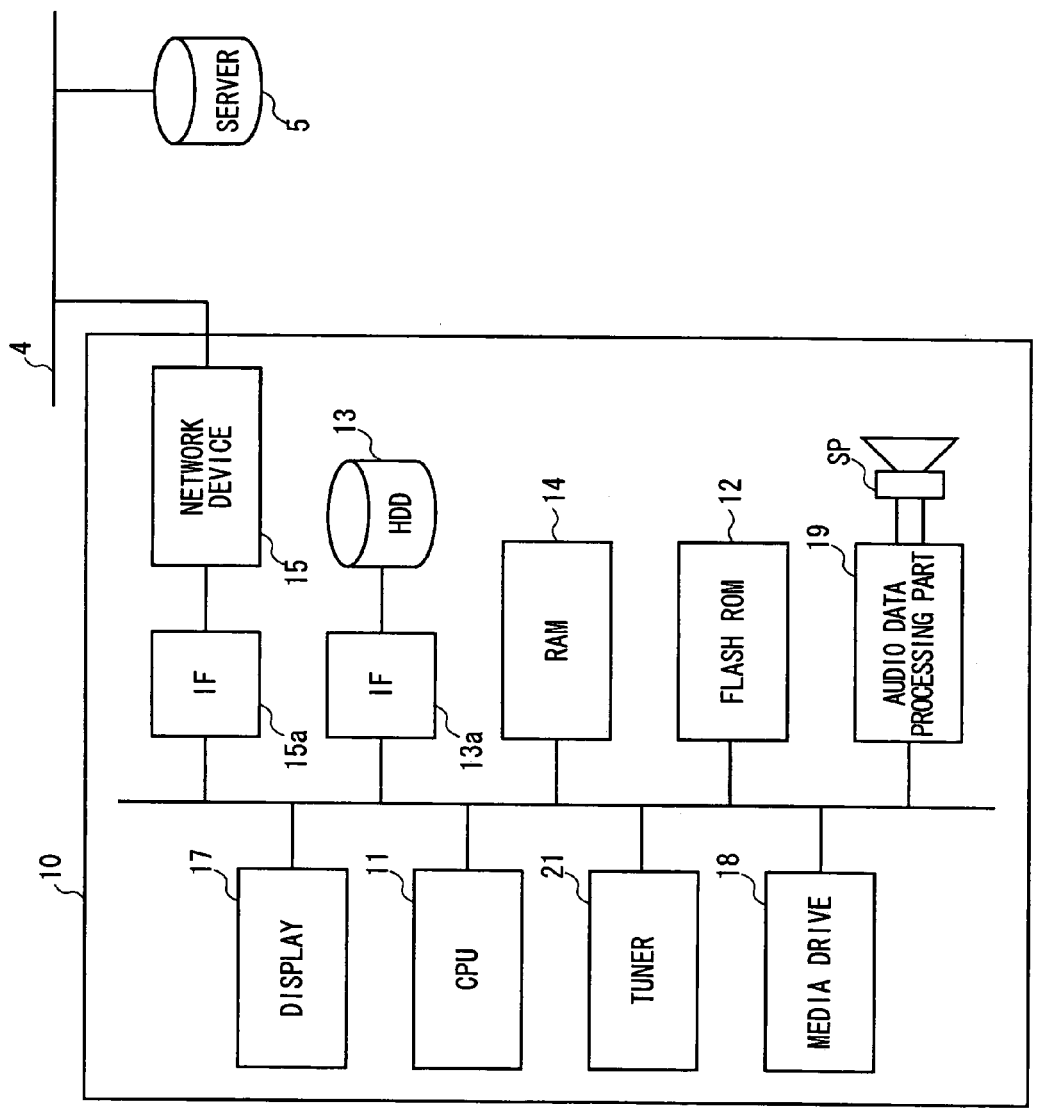
FIG. 2 is a block diagram showing the circuit configuration of the data reproduction device of one embodiment of the present invention.

FIG. 2 is a block diagram showing the circuit configuration of the data reproduction device of one embodiment of the present invention.

The data reproduction device according to this embodiment is characterized by the ability to change the threshold value of the compressed data to be buffered depending on the bit rate of the contents for the streaming reproduction.

In FIG. 2, the client terminal 10 configuring the portable information terminal device comprises: a CPU 11, a Flash ROM (Read Only Memory) 12 for storing a program, a hard disc drive (HDD) 13 with a predefined threshold value, a RAM (Random Access Memory) 14 to lay out the program to run, a network device 15 to connect to a network, a bus 16, etc.

The CPU 11 is a means for overall control or predefined computation on the basis of a basic program such as OS read out from the flash ROM12 connected through the bus 16 and laid out on the RAM14 and various application programs. And it runs, for example, communication operations through the network 4, input/output operations from users, reproduction of the contents from media or writing the contents downloaded from the radio station RS, and management of HDD 13, etc.

In the HDD 13, a predefined threshold value is set for the size of the data temporarily stored when the compressed data stored in the HDD 13 is reproduced by streaming. And, the HDD 13 is connected to the CPU 11 through the interface 13*a* and the bus 16.

The network device 15 is connected to the bus 16 through the interface 15*a*, and encodes the data for sending under the control of the CPU 11, sends the data to the external network equipment through the network 4, or decodes the data received from the external network equipment and transfers the data to the CPU 11. The CPU 11 acquires the bit rate of the compressed data from the data in the server 5 pages in advance, or reads in the bit rate data in the header or tag information of the transferred contents data and is able to detect the compression rate of the compressed data prior to downloading.

The display 17 may be a display device such as liquid crystal display for example, being attached directly on the surface of the enclosure body of the client terminal 10, or an external display device that can-display the result of processing by the CPU 11 and various kinds of information.

The media drive 18 is a drive to reproduce from a CD (Compact Disc) player and a Memory Stick (trade mark) made of the flash memory and the like, for example. The result of reproduction by the media drive 18 is output from the 2-channel speaker SP after the digital-to-analog conversion through the audio data processing part 19.

When the data reproduced through the media drive 18 is the audio contents of music, the CPU 11 stores the data in the HDD 13 as an audio data file.

The CPU 11 can read a number of still images stored in the Memory Stick by the media drive 18 and display them in the display 17 as slide show. Besides, the CPU 11 can also read a number of music stored in the HDD 13 by random access and reproduce to output in the order of user request just like juke box.

A tuner 21, AM/FM radio tuner, and so forth for example, is also connected through the bus 16 to the CPU 11. The tuner 21 decodes the received broadcast signal with the control by the CPU 11, and outputs the result by means of the audio data processing part 19 from the speaker SP as broadcast sound.

According to this embodiment, it is assumed that the MP3 (MPEG Audio Layer 3), a sort of high efficiency coding methods is used in the audio data processing part 19. And, the TCP/IP protocol is assumed for data communication with the Internet. However, the present invention is not limited to these assumptions, that are independent of the music data-encoding format, configuration of decoding means, communication protocol, and so forth. For example, high efficiency coding methods may be ATRAC3 (Adaptive Transform Acoustic Coding 3), AAC (Advanced Audio Coding), WNA (Windows Media Audio), RealAUDIO G2 Music Codec, and so forth, other than MP3. Such data reproduction device may be configured from existing one.

The features of the present invention are the novel streaming reproduction processing of the CPU 11 and the computer program to realize the novel streaming reproduction processing.

The client terminal 10 of such hardware configuration can reproduce the streaming data.

Figure 3:
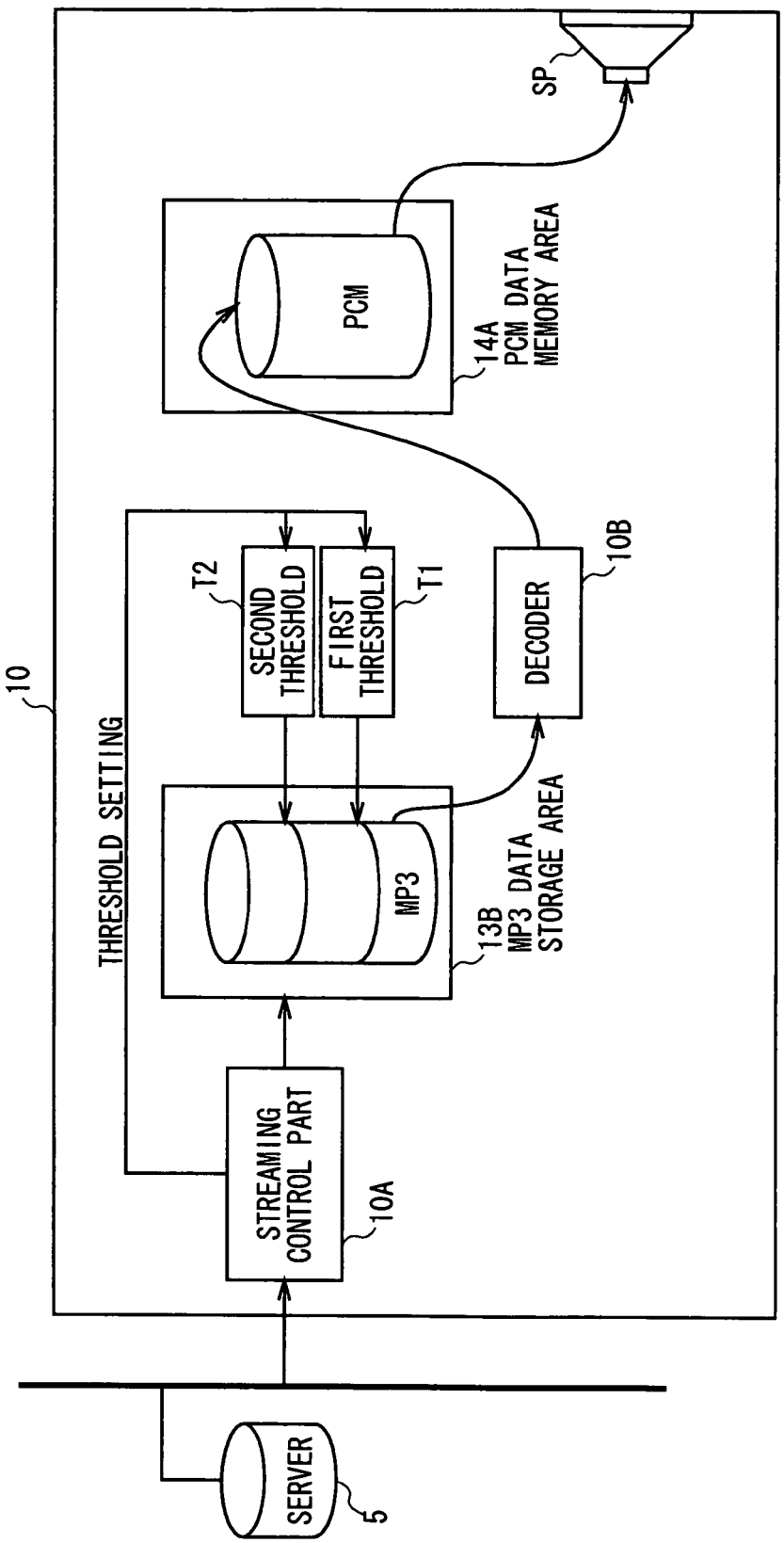
FIG. 3 is a conceptual diagram of the streaming data reproduction processing.

FIG. 3 is a conceptual diagram of the streaming data reproduction processing. In the example shown in FIG. 3, it is assumed that the compressed data encoded in MP3 format is expanded to PCM (Pulse Code Modulation) data and reproduced.

In the client terminal 10 MP3 data storage area 13*b* is secured in the HDD 13. And the PCM data storage area 14*a* is secured in the RAM 14. In addition, the first threshold value T1 and the second threshold value T2 are stored in the RAM 14. Before starting to download the streaming data, predefined initial values are set for the first threshold value T1 and the second threshold value T2.

The streaming data is controlled by the streaming control part 10*a*. The function of the streaming control part 10*a* is implemented by the CPU 11 which controls the network device 15 and the interface 15*a*.

The streaming control part 10*a* acquires MP3 streaming data from the server 5 and accumulates it in the MP3 data storage area 13*b*. At this point, the streaming control part 10*a* decides the compression rate from the bit rate (the size of digital data converted from 1 second of music data) information contained in the header information of the streaming data being acquired. The streaming control part 10*a* can estimate, for example, if the bit rate is high, then the compression rate is low and if the bit rate is low, then the compression rate is high, on the contrary. Besides, the streaming control part 10*a* estimates the load of the network 4 from the data transfer rate through the network 4.

And the streaming control part 10*a* changes the first threshold value T1 and the second threshold value T2 according to the compression rate of the streaming data and the load of the network 4. Specifically, the lower the compression rate, the higher the first threshold value T1 and the second threshold value T2 are. And, the larger the load of the network 4 (the slower the transfer rate), the higher the first threshold value T1 and the second threshold value T2.

The streaming control part 10a monitors the amount of data stored in the MP3 data storage area 13b, and stops the MP3 data acquisition through streaming when the amount of data exceeds the second threshold value T2. And then, when the amount of data stored in the MP3 data storage area 13b becomes less or equal to the second threshold value T2, the streaming control part 10a resumes acquisition of the MP3 data through streaming.

The MP3 data stored in the MP3 data storage area 13b is expanded (i.e., decoded) by the decoder 10b, and stored in the PCM data storage area 14a as PCM data. In addition, the decoder 10b starts to decode the MP3 data when the amount of data stored in the MP3 data storage area 13b exceeds the first threshold value T1. The decoded MP3 data is deleted from the MP3 data storage area 13b. After that, when the amount of data stored in the MP3 data storage area 13b becomes less or equal to the first threshold value T1, the decoder 10b stops decoding the MP3 data.

The PCM data stored in the PCM data storage area 14a is reproduced sequentially by the audio data processing part 19 and output by the speaker SP.

Next, an example of processing of the streaming reproduction in the aforementioned client terminal 10 is described.

Figure 4:
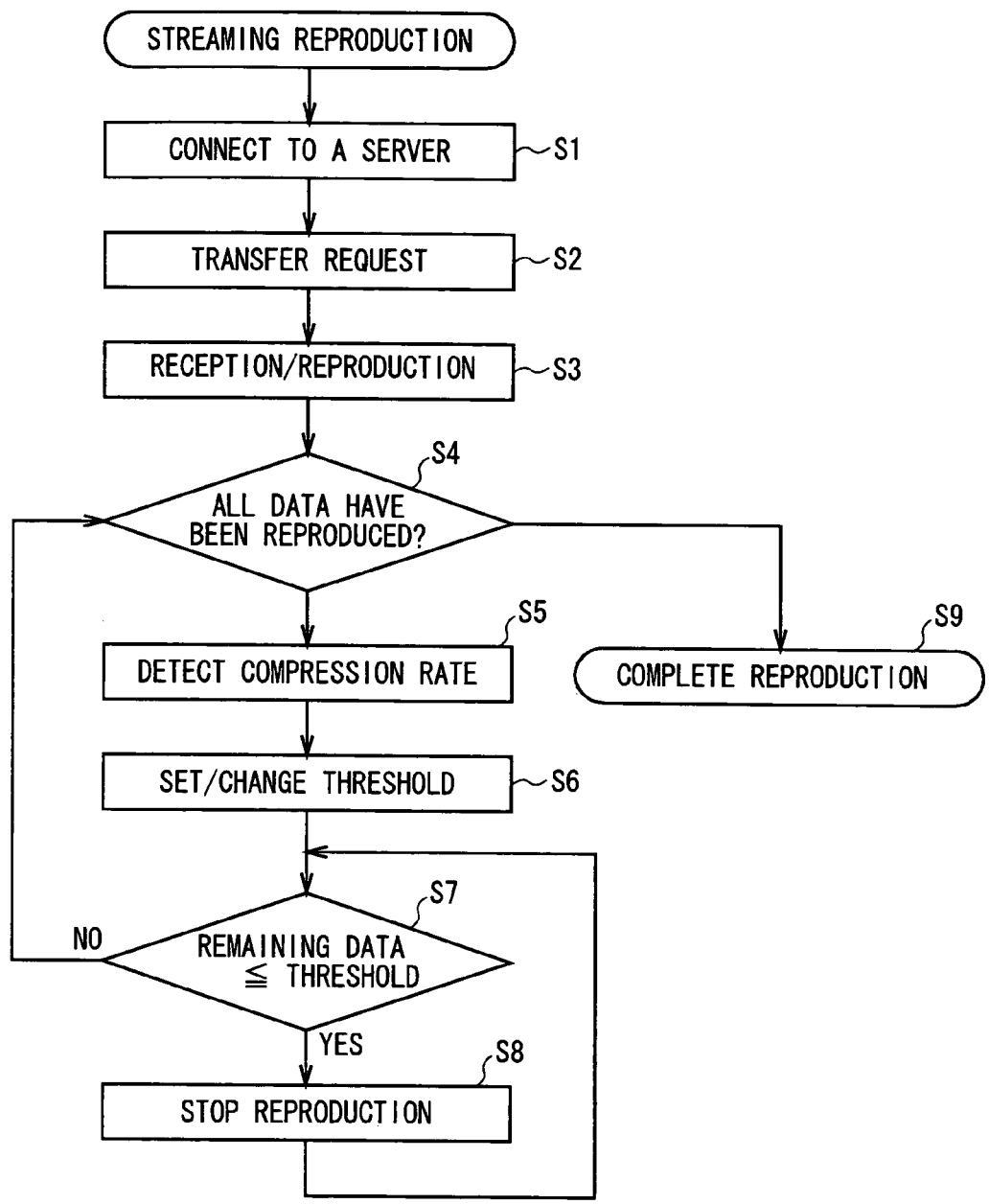
FIG. 4 is a flow chart showing the reproduction sequence of the compressed data of the data reproduction device of one embodiment of the present invention.

FIG. 4 is a flow chart showing the reproduction sequence of the compressed data of the data reproduction device of one embodiment of the present invention.

First, a listener specifies desired music and connects the client terminal 10 to the music delivery server 5 which provides the music information (S1). Next, the CPU 11 of the client terminal 10 requests the server 5 to transfer the maximum size of the partial data (S2) within the range that does not caused overflow of the compressed data in the HDD 13 when music data is downloaded from the server 5 as compressed data. After that, the CPU 11 starts to receive the data, waits for buffering (storing) of a prescribed amount of compressed data, and starts to reproduce (i.e., expand) the music in parallel with reception of data (S3).

Next, the CPU 11 checks whether all music data that should be downloaded is reproduced (S4). As a result, the CPU 11 finds out the data size of the compressed data that is temporarily stored in the HDD 13 and the compression rate of the received compressed data (S5).

The CPU 11 can detect the compression rate in the step S5 based on the data contained in the header or the footer of the file of the compressed data that is received. In addition, the CPU 11 can also detect the compression rate in the step S5 based on the bit rate data about the received compressed data.

Next, the CPU 11 sets the threshold value for the data size of the compressed data stored according to the compression rate which is detected at the step S5, and controls and changes the threshold value as required (S6).

In the step S6, the CPU 11 controls to change the threshold value of the compressed data which is temporarily stored in the HDD 13, by making it larger when the compression rate is lower, and making it smaller when the compression rate is higher.

Next, the CPU 11 checks whether the remaining amount of the non-reproduced compressed data in the HDD 13 is less or equal to the setting threshold value (S7) or not. At this point, the CPU 11 temporarily stops reproducing the data when it finds that the remaining amount of the compressed data is less or equal to the threshold value (S8), and returns to the step S7 again. In the meantime, the client terminal 10 continues to download the compressed data. Therefore, the CPU 11 determines that the remaining amount of compressed data is greater or equal to the prescribed threshold value at some point in the step S7, returns to the step S3 at that point, resumes reproduction of the data, and repeats each of the above steps from S4 to S8. And, the CPU 11 ends reproduction processing when all data is finished for reproduction (S9).

The CPU 11 can continue to reproduce to a prescribed point of time without immediately stopping reproduction processing even when the remaining amount of compressed data is less or equal to the threshold value in the step S8. Accordingly, since the CPU 11 can adjust the interval of the sound discontinuity, it can control the deterioration of the reproduction quality due to sound discontinuity.

Besides, in the step S6, the CPU 11 sets the second threshold value T2 to determine the timing to stop downloading into the HDD 13, aside from the first threshold value T1 to determine the timing to read out the compressed data from the HDD 13, thus it changes and controls each threshold value.

The threshold value T1 can be expressed as follows:

$$T1 = N \times B \times R$$

$$T2 = 2N \times B \times R$$

where, N is the performance of network (i.e., transmission capability of the communications network), B is the compression rate, and R is the coefficient to convert to the number of bytes.

Here, the performance N is the coefficient with the maximum value of 1 (in the best case) and minimum value of 2 (in the worst case). The compression rate B is the bit rate of the contents (i.e., "64" for 64 Kbps and "128" for 128 Kbps). Thus, it is preferred that the threshold value is controlled to vary depending not only on the compression rate B but also on the transmission capability of the communications network used. This is due to the possibility that the reception rate of the compressed data may become slower than the reproduction rate if the condition of the network is bad. Besides, regarding the CPU 11 controlled adjustments of the threshold values T1 and T2, it is also possible to use a table for setting the threshold values.

As mentioned above, means of buffering in the terminal is devised to prevent deterioration of the reproduction quality, because the download from the network involves instability due to network conditions and the time consuming buffering. The information terminal device can determine the buffer size that can absorb the unstable network conditions and the time required for buffering, as the threshold value T1 in advance. And, the information terminal device starts to reproduce when the remaining amount of the compressed data exceeds the threshold value T1 (S3), and the download from the network is temporarily suspended when it exceeds the threshold value T2 while continuing the reproduction, and then the download from the network (S3) is resumed when the amount of the data becomes less than the threshold value T2, and further, reproduction (S8) is temporarily suspended when it becomes less than the threshold value T1. The information terminal device can absorb too sensitive input factors caused by unstable downloading from the network by means of this streaming reproduction, making it possible to- prevent from unpleasant sound discontinuity.

Figure 5:
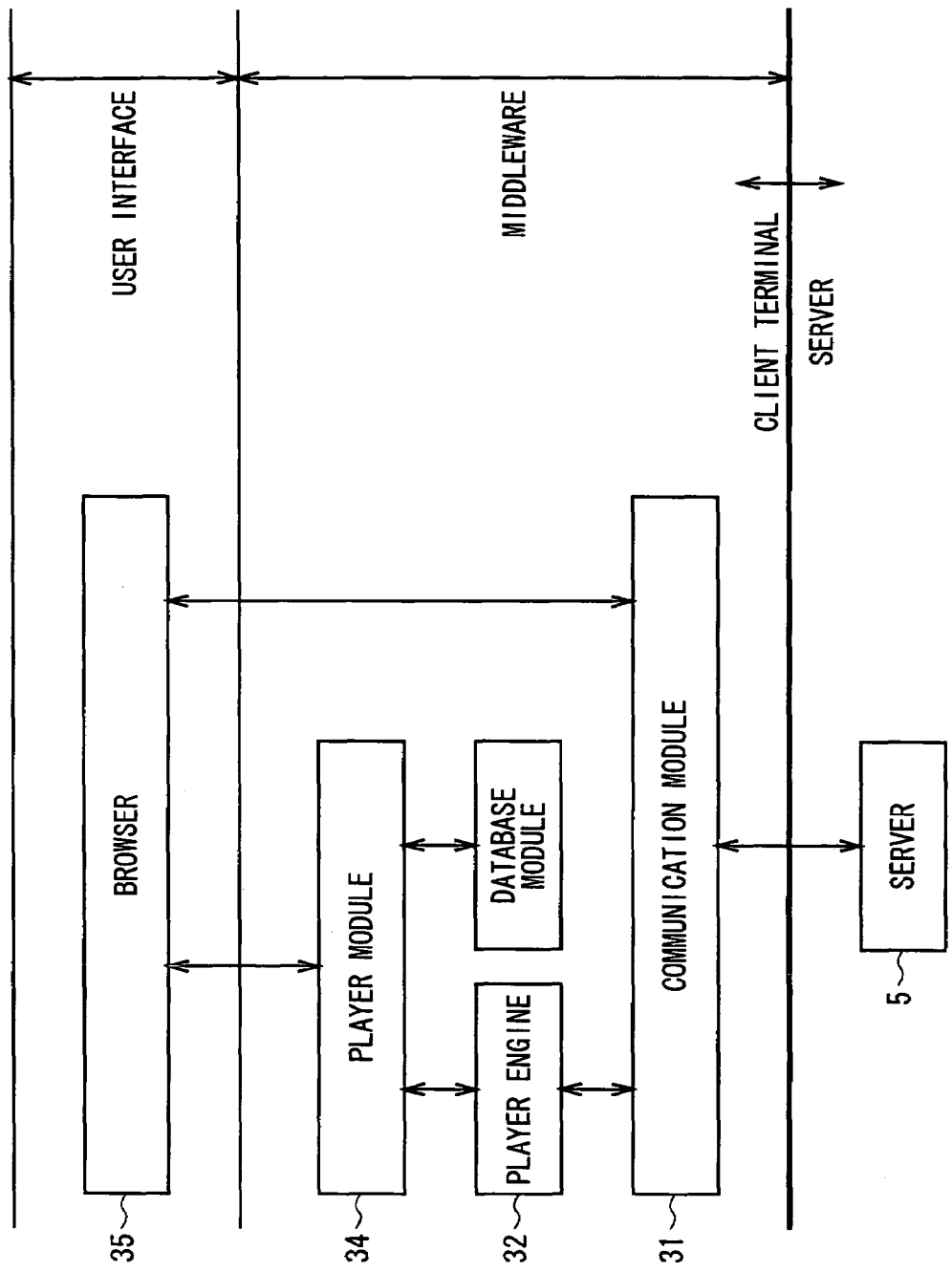
FIG. 5 shows the program modules of the data reproduction device of one embodiment of the present invention.

FIG. 5 shows the program modules of the data reproduction device of one embodiment of the present invention.

The program configuration in the client terminal 10 is provided with a middleware comprising a communication module 31 for controlling network communications, a player engine 32 for converting the data type by estimating the compression type and data size of the contents data, a data base module 33 in which the contents data is stored and a player module 34 for actual reproduction control such as reproduction of display images and sound effects, and with a browser 35, a user interface for the transition and display of the web pages and reproducing sound effects.

The communication module 31 as shown in FIG. 5 has the function of the streaming control part 10*a* in FIG. 3. And the player engine 32 as shown in FIG. 5 has the function of the decoder 10*b* in FIG. 3.

Figure 6:
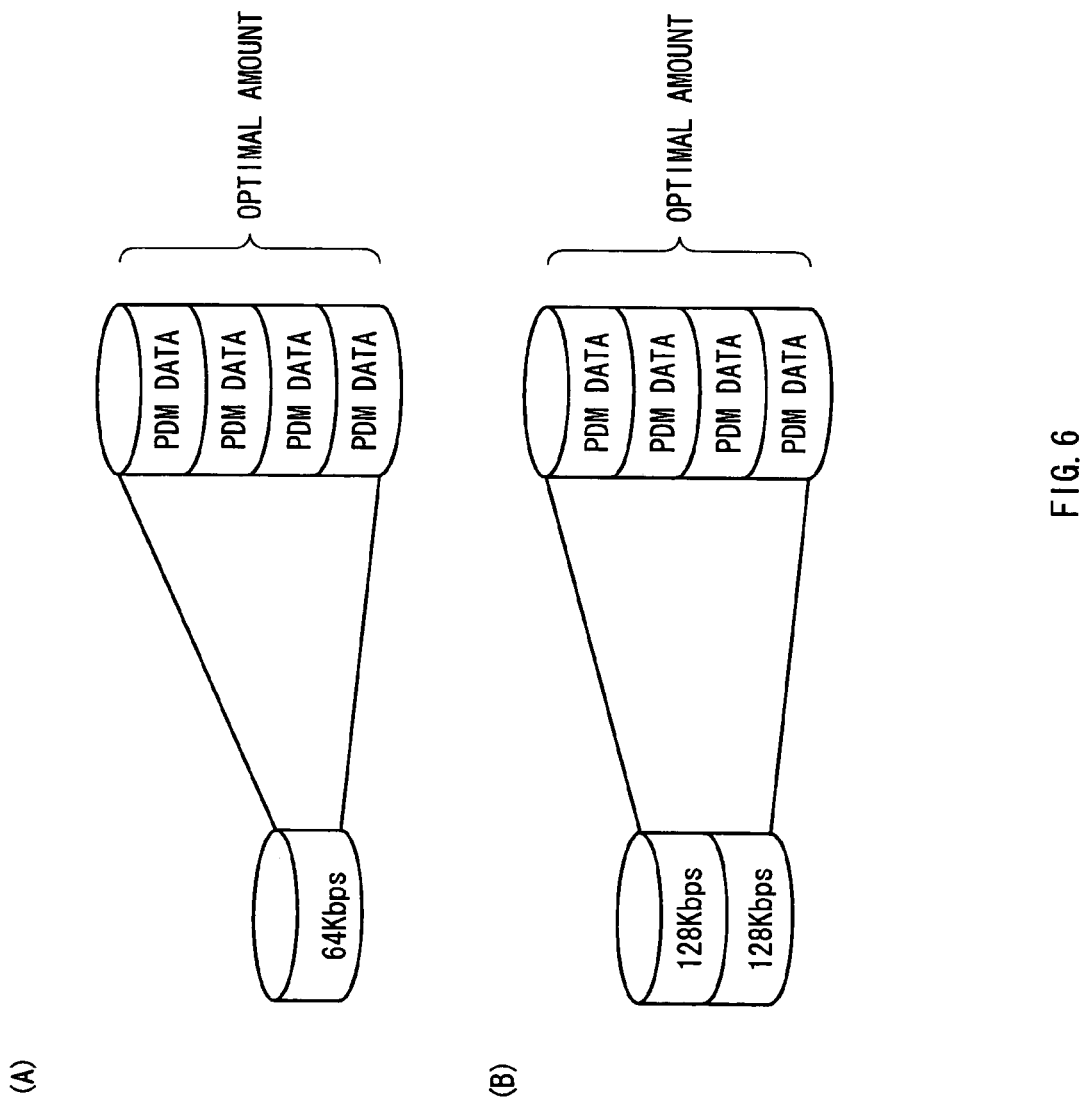
FIG. 6 shows the size of digital data reproduced from the compressed data with different bit rate.
Figure 7:
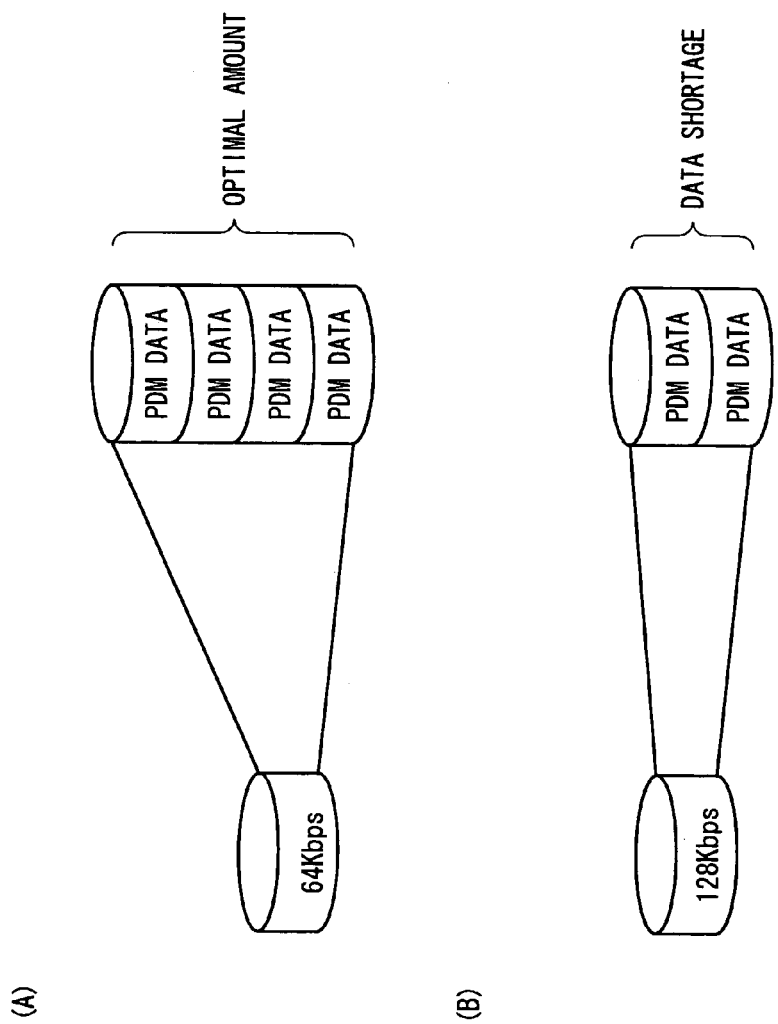
FIG. 7 shows the size of digital data reproduced from the compressed data with different bit rate.
Figure 8:
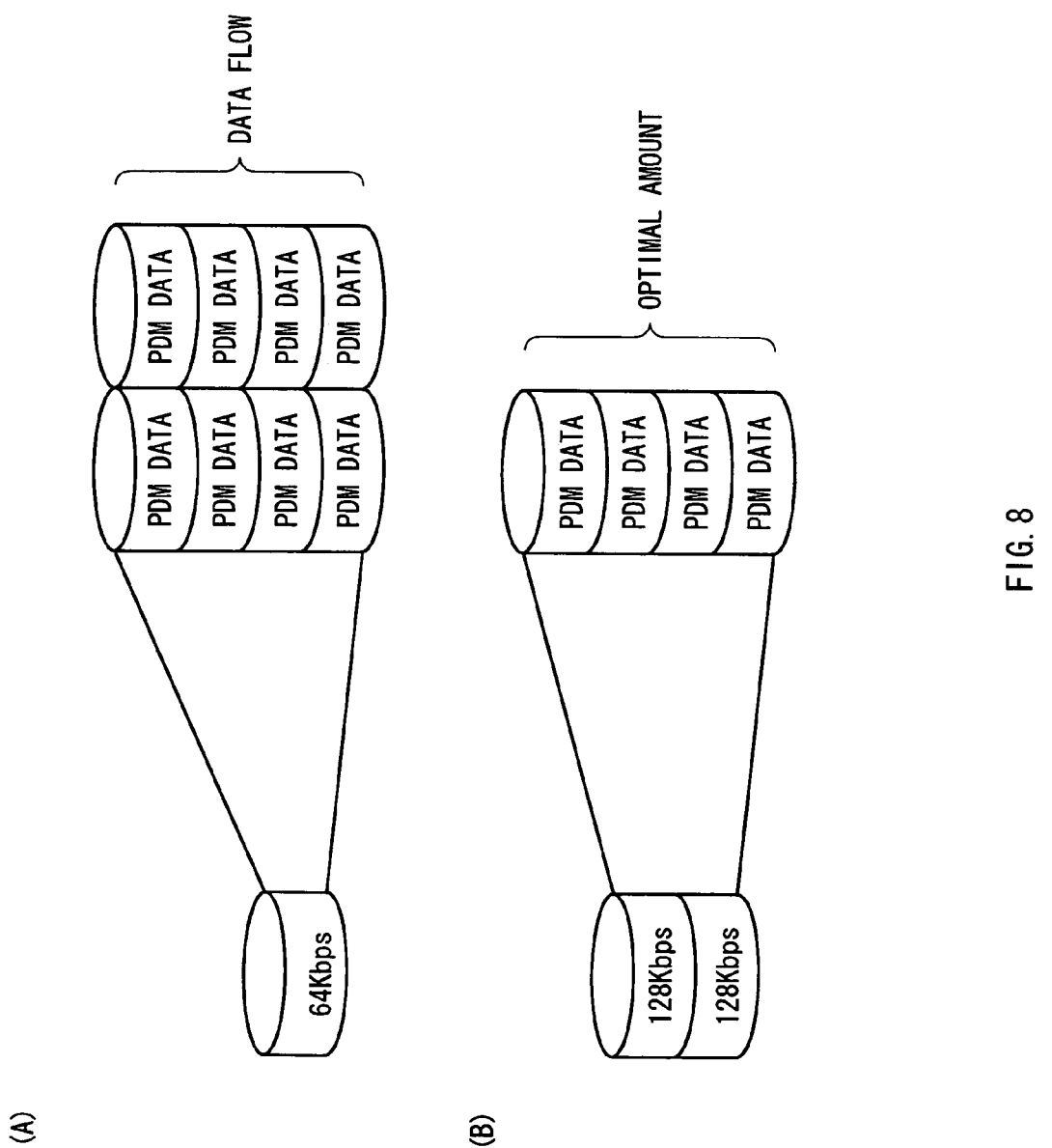
FIG. 8 shows the size of digital data reproduced from the compressed data with different bit rate.
Figure 9:
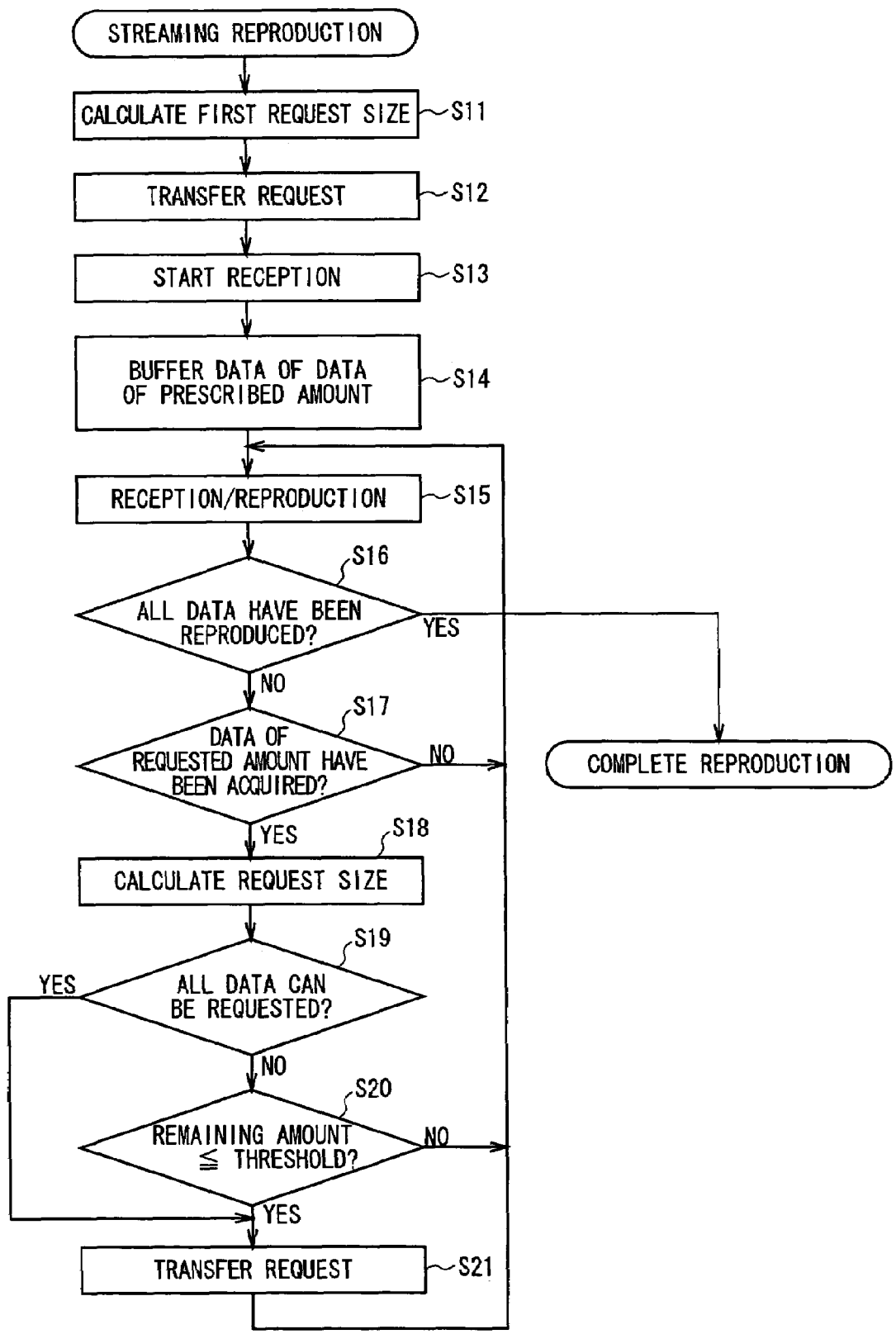
FIG. 9 is a flow chart showing an example of the processing of a conventional streaming reproduction.

FIGS. 6 to 8 show the amount of digital data reproduced from the compressed data with different bit rate. Here it is assumed that there exist high bit rate data of 128 Kbps and low bit rate data of 64 Kbps in MP3 compression format, as the compressed data transferred from the transmission side, and the PCM data is obtained after expansion processing of the compressed data and restoring it to original music data.

In MP3 compression method, the information volume per one second is expressed as bit rate, and 128 Kbps is a typical bit rate for MP3 files. Large bit rate of the compressed data means that, sound quality of the decompressed sound data is high while the compression rate for data transmission is low. In the ID3 Tag attached to the MP3 files, text information such as music title, artist name, music genre, etc., including aforementioned compression rate and sampling frequency can be written freely.

As shown in FIG. 6, to obtain the PCM data of the same level, for example, such as reproduction time of four minutes from the compressed data with different bit rate, memory capacity of larger size is required to store the compressed data with the contents of higher bit rate (128 Kbps), as compared with the contents of lower bit rate (64 Kbps). In this example, a buffer memory of twice as large as the memory capacity is required to store the compressed data of 128 Kbps bit rate as shown in FIG. 6(*b*), against the compressed data of 64 Kbps bit rate as shown in FIG. 6(*a*).

Therefore, it is clear that the PCM size of the music data restored from the contents with higher bit rate (128 Kbps) is smaller as shown in FIG. 7, providing that the threshold value for the data size of the compressed data is constant, regardless of the bit rate of the compressed data stored in the buffer memory. In other words, the PCM data for four minutes is obtained from the compressed data of the bit rate of 64 Kbps as shown in FIG. 7(*a*), but, even if that data is assumed to be an optimum amount of data, only half of the PCM data (two minutes long) is obtained when the same threshold value is used for the bit rate of 128 Kbps as shown in FIG. 7(*b*). In streaming reproduction, if the PCM data to be buffered is short of data, the interval of sound discontinuity gets shorter causing the deteriorated quality.

On the contrary, if the threshold value for the bit rate of 128 Kbps is set higher so as to obtain the PCM data for four minutes as shown in FIG. 8(*b*), twice as large as the PCM data (eight minutes) can be reproduced when the contents of lower bit rate (64 Kbps) with the same threshold value is stored. If such excessive PCM data exists, the buffer memory holds data more than necessary, resulting in the waste of resources of the information terminal devices.

The data reproducing method of the embodiment of the present invention makes it possible to assure the quality of reproduction while optimizing the memory resources by changing and setting the threshold value in the buffer memory according to the bit rate of the compressed data which is delivered.

And, regarding the data reproduction method, if it is necessary to limit the amount of memory to be used for the information terminal-devices and users do not require very high sound quality, low bit rate (high compression rate) can be selected for the compressed data. In this case, lower threshold value can be set for the data reproduction method. On the other hand, regarding the data reproduction method, if the terminal devices are not of so much of limited memory usage and the users require higher sound quality, high bit rate (low compression rate) can be selected for the compressed data. In this case, regarding the data reproduction method, high threshold value can be set for the buffer memory.

Thus, with the data reproduction method, it is possible to assure the reproduction quality, since the threshold value for the buffer is selected according to the bit rate of the compressed data, making it possible to adjust the interval of the sound discontinuity due to the shortage of the reproduced data, properly.

In addition, with the data reproduction method, it is possible to optimize the memory resources such as RAM size, etc., since it is possible to select the proper threshold value according to the requirements of the information terminal devices such as available bit rate for the received compressed data and the memory size for buffering the data.

In the aforementioned embodiment, radio broadcasting from the radio stations was adopted as broadcasting received by the client terminals 10, however, it is not limited to this case and also possible that the client terminal 10 receives internet radio broadcasting or satellite radio broadcasting and acquires their related information and the radio broadcast information or receives television broadcasting from TV broadcast stations and acquires various broadcast information related to the TV programs of the TV broadcasting from the servers on the network such as the Internet 20.

And, in the aforementioned embodiment, present invention was applied to the streaming reproduction of sound (audio data), however, the present invention is not limited to this case and also applicable to the streaming reproduction of other variation of data available for streaming reproduction, such as video data of the movies or TV broadcasting, etc., computer graphics data like game data, etc.

Further, the aforementioned embodiment describes the case where the data reproduction device according to the present invention was applied to the client terminal 10, however, the present invention in not limited to this case and applicable extensively to other various data reproduction device such as information processing device, like personal computer, cell-phone, PDA (Personal Digital Assistant), game machine and the like, and the television set, radio set, CD player, DVD (Digital Versatile Disc) player, hard disk player, etc.

That is, in the aforementioned embodiment the hardware circuit block with reference to FIG. 2 and the program module with reference to FIG. 5 being implemented on the client terminal 10 was described, however, the present invention is not limited to that case and these may be implemented in various terminals other than the client terminal 10, such as cell-phone and personal computer, etc. And the terminals with these hardware circuit block and program module are implemented can preform the processing similar to the client terminal 10.

Besides, above processing function can also be realized by the computer. In this case, the computer is provided with a program that has the description of the processing of the functions that is possessed by the client terminal 10. The computer realizes the aforementioned processing functions by executing the program. The program describing the processing may be recorded in a recording medium that can be read by the computer. The recording medium that can be read by the computer includes a magnetic recording device, an optical disk, a magneto-optical recording medium, a semiconductor memory, and so forth. The magnetic recording device includes a hard disk device (HDD), a flexible disk (FD), a magnetic tape, and so forth. The optical disk includes a DVD, DVD-RAM, CD-ROM, CD-R (Recordable)/RW (ReWritable), and so forth. The magneto-optical medium includes an MO (magneto-Optical disk), and so forth.

To distribute the program, portable recording medium such as DVD, CD-ROM with the program recorded, for example, may be put on the market. Besides, the program can also be transferred from the server computer via a network to other computers, with the program being stored in the storage device of the server computer.

The computer which executes the program stores the program recorded in the portable type recording media or the program transferred from the server computer, for example, in its storage device. Then, the computers read the program from its storage devices and execute the processing according to the program. Besides, the computer can also read the program directly from the portable type recording media and execute the processing according to the program. In addition, the computer can also execute the process sequentially with each program transferred from the server computers.

Further, in the aforementioned embodiment it was described about the case where the above mentioned program of the present invention was applied to the program modules with reference to FIG. 5, however, the present invention is not limited to this embodiment and other programs of various configurations can be applied.

Further, in the aforementioned embodiment it was described about the case where the HDD (hard disk drive) 13 was used as a temporary memory device to store the downloaded compressed data with reference to FIGS. 1 to 8, however, the present invention is not limited to this case and can be applied extensively to other memory means like a disk type recording medium such as a magneto optical disk, a drive circuit with hardware circuit configuration to store data in storage media such as semiconductor memory and a CPU which stores data in the storage media as instructed by various programs (i.e., software), provided that the downloaded compressed data can be stored temporarily.

Further, in the aforementioned embodiment it was described about the case where the CPU 11 was applied as data expanding means to expand the compressed data which is stored in the memory means with reference to FIGS. 1 to 8, however, the present invention is not limited to this case and other various data expanding means like a data expanding circuit of hardware circuit configuration to expand the compressed data, a microcomputer which expands the compressed data as instructed by various programs (i.e., software) can be applied extensively, provided that the compressed data can be expanded.

Further, in the aforementioned embodiment it was described the case where the CPU 11, the RAM 14 and the audio data processing part 19 were applied as reproducing means for the streaming reproduction of the data which is expanded by the data expanding means with reference to FIGS. 1 to 8, however, the present invention is not limited to this case and other various reproducing means like a reproducing circuit of hardware circuit configuration for the streaming reproduction of the data, a CPU unit for the streaming reproduction of the data as instructed by various programs (i.e., software) can be applied extensively provided that the streaming reproduction of the data can be performed.

Further, in the aforementioned embodiment it was described about the case where the CPU 11 was applied as detecting means for detecting the data size of the compressed data temporarily stored in the memory means and the compression rate of the compressed data that is downloaded with reference to FIGS. 1 to 8, however, the present invention is not limited to this case and other various data expanding means like a detecting circuit of hardware circuit configuration to detect the data capacity of the compressed data, a microcomputer which detects the data capacity and compression rate of the compressed data as instructed by various programs (i.e., software) can be applied extensively, provided that the data capacity and compression rate of the compressed data can be detected.

Further, in the aforementioned embodiment it was described about the case where the CPU 11 was applied to change and control the threshold value for the data size of the compressed data according to the compression rate detected by the detecting means and also to read the compressed data from the memory means and transferring to the data expanding means when the data size temporarily stored in the memory means is greater or equal to a prescribed threshold value with reference to FIGS. 1 to 8, however, the present invention is not limited to this case and other various control means like a microcomputer which operates according to the control circuit of the hardware circuit configuration or various programs (i.e., software) can be applied extensively, provided that the compressed data can be read from the memory means and transferred to the data expanding means when the data capacity which is temporarily stored in the memory means is equal to or greater than a prescribed threshold value as well as changing and controlling the threshold value for the data capacity of the compressed data according to the compression rate detected by the detecting means.

INDUSTRIAL APPLICABILITY

The present invention can be used for a contents delivering system and the like that delivers music, video or image and other related information from a broadband network such as internet directly to audio and visual equipment, etc., connected to a network.

The invention claimed is:

1. A data reproduction device for expanding and reproducing compressed data downloaded through a communication network, comprising:
   memory means for temporarily storing the compressed data downloaded;
   data expanding means for expanding the compressed data stored in the memory means;
   reproducing means for performing streaming reproduction on data expanded by the data expanding means as soon as an amount of data stored in the memory means exceeds a first threshold value;
   detecting means for detecting a data size of the compressed data temporarily stored in the memory means and a compression rate of the compressed data downloaded; and
   control means for changing the first threshold value and a second threshold value for the data size of the compressed data stored in the memory means based on the compression rate detected by the detecting means, and reading the compressed data from the memory means when the data size of the compressed data temporarily stored in the memory means exceeds the first threshold value and transferring the compressed data to the data expanding means, said control means temporarily stopping reproduction when the compressed data is determined as being less than or equal to the first threshold value until the compressed data is determined as being greater than the first threshold value, said control means temporarily stopping downloading the compressed data from the network when the compressed data in the memory means exceeds the second threshold value until the compressed data is determined as being less than the second threshold value, the second threshold value being higher than the first threshold value.

2. The data reproduction device according to claim 1, wherein the control means changes the first threshold value and the second threshold value larger when the compression rate of the compressed data temporarily stored in the memory means gets lower and changes the first threshold value and the second threshold value smaller when the compression rate gets higher.

3. The data reproduction device according to claim 2, wherein the detecting means detects the compression rate of the compressed data based on data contained in a header or a footer of a file of the compressed data downloaded.

4. The data reproduction device according to claim 2, wherein the detecting means detects the compression rate of the compressed data on the basis of bit rate data of the compressed data downloaded.

5. The data reproduction device according to claim 1, wherein the control means controls to change the first threshold value and the second threshold value in accordance with transmission capability of the communication network.

6. The data reproduction device according to claim 1, wherein the compressed data is MP3 (MPEG Audio Layer 3) data.

7. A data reproduction method for expanding and reproducing compressed data downloaded through a communication network, comprising:
  (a) making a connection to a server delivering the compressed data;
  (b) requesting the server to transfer partial data of a maximum size within such a range that the compressed data does not overflow into a memory means at a time of downloading the compressed data;
  (c) starting reproduction of compressed data as soon as an amount of data stored in the memory means exceeds a first threshold value;
  (d) detecting a data size of compressed data temporarily stored in the memory means, and a compression rate of the compressed data downloaded;
  (e) controlling to change the first threshold value and a second threshold value for the data size of the compressed data based on the compression rate detected in the detecting;
  (f) checking whether or not unreproduced compressed data in the memory means becomes less than or equal to the first threshold value;
  (g) temporarily stopping reproduction when the compressed data is determined as being less than or equal to the first threshold value in the checking until the compressed data is determined as being greater than the first threshold value; and
  (h) temporarily stopping downloading the compressed data from the network when the compressed data in the memory means exceeds a second threshold value until the compressed data is determined as being less than the second threshold value, the second threshold value being higher than the first threshold value,
  wherein (c), (d), (e), (f), (g), and (h) are repeated until a transfer request of all data is completed.

8. The data reproduction method according to claim 7, wherein, in the controlling, control is performed to change the first threshold value and the second threshold value larger when the compression rate of the compressed data temporarily stored in the memory means gets lower, and change the first threshold value and the second threshold value smaller when the compression rate gets higher.

9. The data reproduction method according to claim 8, wherein in the detecting, the compression rate of the compressed data is detected based on data contained in a header or a footer of a file of the compressed data downloaded.

10. The data reproduction method according to claim 8, wherein in the detecting, the compression rate of the compressed data is detected based on bit rate data of the compressed data downloaded.

11. The data reproduction method according to claim 7, wherein in the controlling, control is performed to change the first threshold value and the second threshold value in accordance with transmission capability of the communication network.

12. The data reproduction method according to claim 7, wherein the compressed data is MP3 (MPEG Audio Layer 3) data.

13. A computer recording medium including computer executable instructions, wherein the instructions, when executed by a processor implement a data reproduction method for expanding and reproducing compressed data downloaded through a communication network, the method comprising:
  (a) making a connection with a server delivering the compressed data;
  (b) requesting the server to transfer partial data of a maximum size within such a range that the compressed data does not overflow into the memory means at a time of downloading the compressed data;
  (c) detecting a data size temporarily stored in the memory means, and a compression rate of the compressed data downloaded;
  (d) starting reproduction as soon as an amount of data stored in the memory means exceeds a first threshold value;
  (e) changing the first threshold value and a second threshold value for the data size of the compressed data based on the compression rate detected in the detecting;
  (f) checking whether or not unreproduced compressed data in the memory means becomes less than or equal to the first threshold value;
  (g) temporarily stopping reproduction when the compressed data is determined as being less than or equal to the first threshold value in the checking until the compressed data is determined as being greater than the first threshold value; and
  (h) temporarily stopping downloading the compressed data from the network when the compressed data in the memory means exceeds a second threshold value until the compressed data is determined as being less than the second threshold value, the second threshold value being higher than the first threshold value,
  wherein (c), (d), (e), (f), (g), and (h) are repeated until a transfer request of all data is completed.

14. A data reproduction device for expanding and reproducing compressed data downloaded through a communication network, comprising:
  a memory configured to temporarily store the compressed data downloaded;
  a data expanding unit configured to expand the compressed data stored in the memory;

a reproducer configured to perform streaming reproduction on data expanded by the data expanding unit as soon as an amount of data stored in the memory exceeds a first threshold value;

a detector configured to detect a data size of the compressed data temporarily stored in the memory and a compression rate of the compressed data downloaded; and a controller configured to change the first threshold value and a second threshold value for the data size of the compressed data stored in the memory based on the compression rate detected by the detector, to read the compressed data from the memory when the data size of the compressed data temporarily stored in the memory exceeds the second threshold value, to transfer the compressed data to the data expanding unit, and to temporarily stop reproduction when the compressed data is determined as being less than or equal to the second threshold value until the compressed data is determined as being greater than the second threshold value, said controller configured to temporarily stop downloading the compressed data from the network when the compressed data in the memory exceeds a second threshold value until the compressed data is determined as being less than the second threshold value, the second threshold value being higher than the first threshold value.

15. The data reproduction device according to claim 14, wherein the controller is configured to change the first threshold value and the second threshold value larger when the compression rate of the compressed data temporarily stored in the memory gets lower and to change the first threshold value and the second threshold value smaller when the compression rate gets higher.

16. The data reproduction device according to claim 15, wherein the detector is configured to detect the compression rate of the compressed data based on data contained in a header or a footer of a file of the compressed data downloaded.

17. The data reproduction device according to claim 15, wherein the detector is configured to detect the compression rate of the compressed data on the basis of bit rate data of the compressed data downloaded.

18. The data reproduction device according to claim 14, wherein the second threshold value is twice the first threshold value.

19. The data reproduction device according to claim 14, wherein the first threshold value is equal to N×B×R and the second threshold value is equal to 2N×B×R, where N is a transmission rate of the network, B is the compression rate, and R is a conversion coefficient wherein N, B and R are all greater than zero.

* * * * *